Patented May 16, 1950

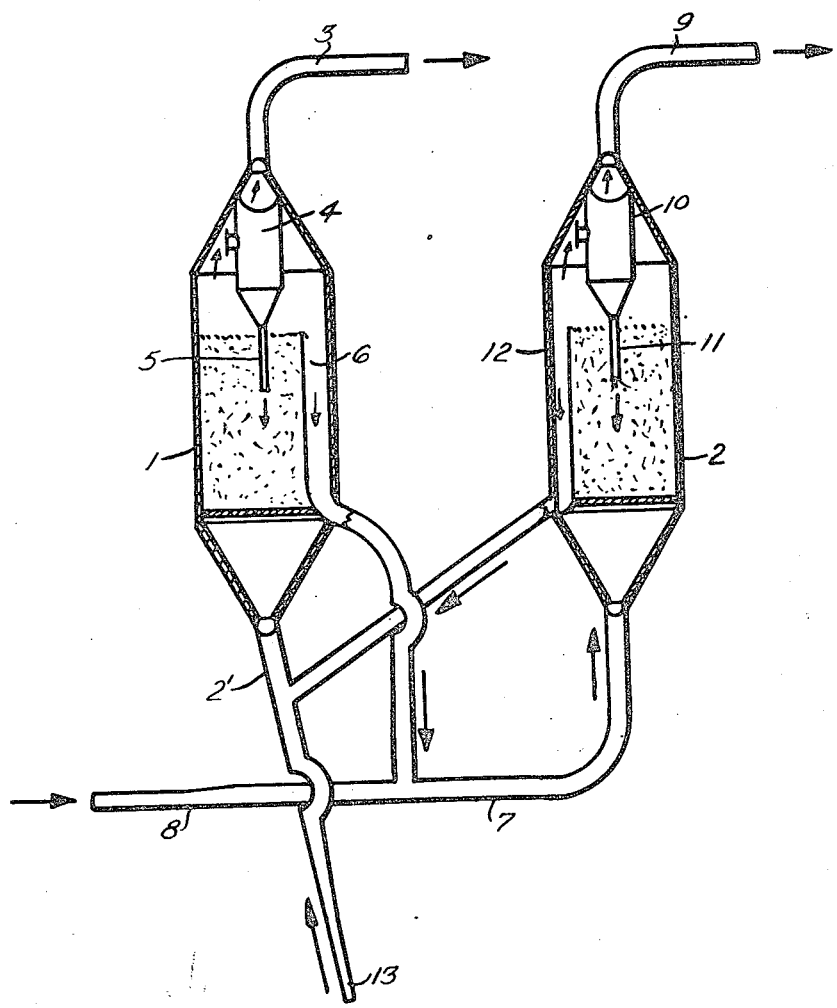

2,507,502

UNITED STATES PATENT OFFICE 2,507,502

OXYGEN CARRIER FOR THE OXIDATION OF GASEOUS HYDROCARBONS

Eugene S. Corner, Roselle, Robert V. J. McGee, Union, and Charles S. Lynch, Plainfield, N. J., assignors to Standard Oil Development Company, a corporation of Delaware Application August 12, 1947, Serial No. 768,248

3 Claims. (Cl. 252—186)

In our copending application "Production of industrial gases containing carbon monoxide," Serial No. 6,226, filed February 4, 1948, we have described and claimed a method of converting a gaseous hydrocarbon into a mixture of carbon monoxide and hydrogen utilizing an oxygen carrier containing titania.

The present invention is directed to a method for producing industrial gases containing carbon monoxide and hydrogen from gaseous hydrocarbons and to novel compositions useful as oxygen carriers in the oxidation of gaseous hydrocarbons.

In many industrial processes the raw material is composed of, or essentially contains, a mixture of carbon monoxide and hydrogen. Chief among these processes are the so-called methanol synthesis, in which carbon monoxide and hydrogen are reacted in the presence of a suitable catalyst to produce oxygenated organic compounds, and the Fischer-Tropsch synthesis, in which carbon monoxide and hydrogen in suitable proportions are reacted in the presence of a suitable catalyst and under selected conditions to produce a product primarily composed of liquid hydrocarbons. In processes of this type it is highly desirable that the feed gas be free from contamination with inert gaseous substances.

The obvious way to obtain a mixture of carbon monoxide and hydrogen is to subject a mixture of a hydrocarbon such as methane and air to controlled combustion. This procedure, however, results in a gas containing a large quantity of nitrogen. This detrimental dilution has led to much study and experimentation, directed toward the development of a method for producing the desired "make gas" free from contaminants and diluents.

Among the procedures which have been proposed for producing from hydrocarbons a suitable gas mixture containing carbon monoxide and hydrogen free from large volumes of diluent gas is that in which a metal is used as an oxygen carrier. The general procedure proposed is to react the hydrocarbon, such as methane, with a metal oxide until the latter is depleted in oxygen content, then to reoxidize the depleted metal carrier with air, venting off the residue gases, and again reacting the regenerated oxide with the hydrocarbon. By this procedure the gas resulting from the reaction of the hydrocarbon with the metal oxide is obtained separately from the gaseous residues from the oxidation of the metal with air.

While a number of metals have been proposed for use in this process they all present different problems when it is attempted actually to use them in the process. Zinc oxide is one which theoretically should serve the purpose admirably because its oxidation potential is such that it is practically impossible to oxidize a hydrocarbon with zinc oxide to carbon dioxide whereby a high selectivity to carbon monoxide can be expected in the use of this metal oxide. Zinc oxide, however, presents the great difficulty that at the temperature at which it will give up its oxygen the zinc will also vaporize, giving rise to a difficult recovery problem. Moreover, zinc oxide does not effect a sufficiently high conversion of the hydrocarbon.

Of the many oxides which might be considered useful, iron oxide, based on the considerations of availability, price and reactivity with hydrocarbons, would seem to be the logical choice. When it is attempted, however, to react a hydrocarbon such as methane with a fixed bed of iron oxide, the course of the reaction proceeds in a direction quite the contrary of that desired. At the outset the iron oxide oxidizes the hydrocarbon completely to carbon dioxide until an appreciable quantity of free iron is present in the reaction mass. From that point on some carbon monoxide is produced but at the same time large quantities of carbon are produced by reason of the highly catalytic effect of the iron on the cracking of hydrocarbons.

Among the metal oxides which have been suggested as an alternative for iron is titania. This oxide shows considerable promise as an oxygen carrier, particularly when using the technique known as the fluidized solids technique in which the carrier in finely divided form is suspended in a rising stream of the hydrocarbon gas to be oxidized in such a manner as to form a dense, fluidized suspension in which the solid particles are in a state of high turbulence. While it has been found that titania gives good results in the fluidized solid type of operation the degree of conversion and selectivity attainable therewith leaves room for considerable improvement.

According to the present invention, the efficacy of titania as an oxygen carrier is increased by using in conjunction therewith one or more metal oxides, which are solid and reducible at a temperature between 1600° and 2400° F., of which the metal is commonly found in alloy steels. Of course there are many metals used in alloy steels which are not suitable for use according to the present invention. Metals, such as silicon and beryllium, have oxides which are not reducible under the conditions specified. Metals, such as vanadium and molybdenum, have oxides which melt at too low a temperature. Actually the metals useful in alloy steels the oxides of which are effective for the purpose of the present invention are iron, manganese, chromium, nickel, cobalt and tungsten. Mixtures of these oxides are particularly suitable.

A preferred carrier according to the present invention is titania associated with the oxides of iron, nickel and chromium. In this composition the titania should constitute at least about 90% by weight. The remainder of the composition may be made up of the other three oxides in variable proportions. Suitable proportions for the other three components are 80 $Fe_2O_3$, 10 nickel oxide and 10 chromium. The proportions of nickel and chromium oxide in this mixture can be increased considerably at the expense of the iron oxide.

A composition of this type may be made in various ways. The various oxides can be mixed mechanically into a homogeneous mixture. More intimate mixing may be realized by coprecipitation of the various oxides from mixed solutions of their salts. Again, one of the oxides may be impregnated with a solution of a salt of the other oxide or other oxides and the impregnated oxide dried and calcined. Of the various methods of mixing the coprecipitation is preferred.

In preparing mixed oxygen carriers according to the present invention consideration must be given to the fluidizability of the resulting product. When iron oxide alone is used with titania in the form of a mechanical mixture it should not be present in amounts such as to interfere with the fluidization of the finely divided mixture. Iron oxide has a tendency to become sticky at the operating temperature specified and if it is employed in substantial amounts it tends to cause agglomeration which renders fluidization difficult. Accordingly, in this instance the iron oxide should not constitute more than about 4 parts by weight of the total mixture.

Chromium oxide, on the other hand, can be tolerated in much larger amounts. Mixtures of titania and chromium oxide containing up to 50 parts by weight of the latter are contemplated for use in accordance with the present invention. Manganese oxide and tungsten oxide may also be tolerated in amounts comparable to those specified for chromium oxide. Nickel and cobalt oxides, on the other hand, should be used more sparingly, it being preferred to keep their content when they are employed with titania below about 10%. It will be understood that the limits given for iron, nickel and cobalt may be increased when an oxide, such as chromium oxide, is used conjointly with them.

These limits on the contents of the various addition agents are given primarily in the interest of the fluidizability of the resulting oxygen carrier. Hereinafter when mixtures of these various oxides are referred to as fluidizable, it is intended to indicate that they are present in the mixture within the limits specified above. It is to be borne in mind, however, that the use of these oxygen carriers is not confined to the fluidized solid technique since they may also be used in fixed bed operations.

In the practice of the present invention according to the fluidized solid technique, the solid oxygen carrier is employed in the form of fine particles none of which is substantially larger than 10 mesh and the bulk of which is smaller than about 100 mesh. For good fluidization it is preferred that the powdered material include particles of various sizes ranging upwardly from about 5 microns and containing a substantial fraction between about 200 and 400 mesh. With solids in the foregoing particle size range, suitable fluidization is realized by flowing the gas upwardly through the finely divided solids at a velocity ranging from about .3 to 5 ft./second. It will be understood that lower gas velocities may be employed in which case the action may be more properly described as jiggling than fluidization. Any type of mixing in which there is movement of the solid particles in the gas in such a way as to maintain a substantially homogeneous composition of solids throughout the reaction zone in the form of a dense suspension containing upwards of 5% by volume of solids is satisfactory for the practice of the present invention.

The temperature maintained in the contacting zone in which the hydrocarbon is converted should be at least about 1600° F. and will usually be between 1600° F. and about 2000° F. There is no actual upper limit on this temperature except that dictated by the melting point of the finely divided solid in the contacting zone or the melting point of the material of which the contacting vessel is made.

The nature of the present invention may be more clearly understood from the following detailed description of the accompanying drawing in which the single figure is a front elevation in diagrammatic form of one type of apparatus suitable for the practice of the present invention.

Referring to the drawing in detail numeral 1 designates a reaction vessel and numeral 2 designates a regeneration vessel. In the embodiment shown these vessels operate on the dense phase drawoff principle. It will be understood that these vessels can be of the well known bottom drawoff type or the strictly upflow type.

Vessel 1 is provided at its bottom with an inlet 2' for gas and finely divided solid and at its upper end with an outlet 3 for gas ahead of which is an internal cyclone 4 or other separator for gases and solids having a dip leg 5 depending into the vessel. On one wall the vessel is provided with a duct 6 having its open upper end terminating at the selected level for the dense phase of the suspension. This duct empties into a line 7 into which air or other oxidizing gas is fed through line 8. Line 7 discharges into the bottom of vessel 2 which, like vessel 1, is provided at its upper end with a gas vent 9 ahead of which is arranged a cyclone separator 10 having a dip leg 11 extending into the dense phase of the suspension in vessel 2. Vessel 2 is also provided with a duct 12 on one of its walls having its open upper end located at the intended level of the dense phase of the suspension in vessel 2. Duct 12 empties into line 2' into which is fed a hydrocarbon gas through line 13.

In carrying out the process of the present invention in the apparatus described, the vessels are charged with finely divided solid the individual particles of which are composed of titania impregnated or mixed with iron oxide and/or one or more of the other addition agents specified. As previously indicated, this mixture is conveniently prepared by mixing aqueous solutions of a titanium salt and an iron salt and coprecipitating the hydroxides with an alkali. The precipitate is carefully washed to remove water-soluble contaminants after which it is dried and roasted. If the final product is not in the finely divided form heretofore specified, it is ground so as to satisfy the requirements.

In starting up with both vessels charged with the finely divided solid mentioned above, the system may be brought to a temperature between about 1550 and 1850° F. by feeding hot combustion gases through lines 8 and 13. If desired, some finely divided carbon may be mixed with the initial charge and the system brought to temperature by burning off the carbon. When the operating temperature is attained, a hydrocarbon gas is fed through line 13 at a velocity such as to maintain the finely divided solid in vessel 1 in suspension in the gas in the form of a dense body in which the particles are in incessant motion. The velocity should be so regulated as to produce a suspension having at least about 5% by volume of solids, preferably between about 10 and 25%. The velocity is correlated with the amount of solids charged so as to bring the level of the dense phase to a point where it overflows into conduit 6. The gases passing out of the vessel tend to carry solids with them. These solids are separated in the cyclone 4 and returned to the dense suspension.

As the solid overflows into conduit 6 and thus into line 7, preheated air or other oxidizing medium is fed in through line 8 at a velocity such as to carry the finely divided solid into vessel 2 and maintain it therein in a suspension of the character heretofore described, the level of the dense phase of the suspension being so regulated that the dense phase overflows into conduit 12 which carries solid back into line 2'.

The heat required for the reaction in vessel 1 is supplied primarily as sensible heat contained in the solids returned from vessel 2 supplemented by preheat imparted to the hydrocarbon gas from the hot exhaust gas from vessel 2.

It will be appreciated that the illustration of the apparatus and the drawing is limited to the bare essentials, calculated merely to depict the flow plan of the process. Design and engineering details are purposely omitted to avoid unnecessary complication. Among such details are heat exchangers, aerating jets for the various conduits, pumps, and the like. It is repeated that the flow plan shown is only one of several which may be used, the essential requirement being that the flow plan shall include at least two zones in one of which hydrocarbon is reacted with iron oxide and in the other of which iron with depleted oxygen content is treated with an oxidizing gas so as to replenish its oxygen content.

In order to illustrate the improved results obtainable by the practice of the present invention, the following examples of actual operations are presented:

EXAMPLE I

Methane was converted by contact with titania alone and titania mixed with different amounts of iron oxide in separate operations utilizing the fluidized solid technique. In these operations the oxygen carrier was employed in finely divided form having a wide range of particle size, including particles as small as 5 microns and a substantial proportion of particles between 200 and 400 mesh with all of the particles passing 100 mesh. The operating conditions and results are given in the following table:

*Effect of added iron oxide to $TiO_2$ on methane conversion and selectively to CO*

[Fluid bed; 200 v./v./hr.; 5 min. on stream]

| Iron Oxide Content, Wt. percent | 0 | 1 | | 3 | |
|---|---|---|---|---|---|
| Cycle No | 1 | 4 | 6 | 7 | 8 |
| Temperature, °F | 1,760 | 1,645 | 1,677 | 1,630 | 1,600 |
| Methane Conversion, percent | 32 | 22 | 31 | 54 | 49 |
| Selectivity, Mol. percent: | | | | | |
| CO | 67 | 89 | 88 | 93 | 93 |
| $CO_2$ | 1 | 11 | 2 | 7 | 7 |
| C | 32 | 0 | 10 | 0 | 0 |

From these results it will be apparent that relatively minor amounts of iron oxide when used in conjunction with titania greatly increase the conversion and/or selectivity. It is noteworthy that while carbon was produced when only 1% or iron oxide was used, no carbon was formed when 3% of iron oxide was used. With iron oxide as an addition agent the best results are obtained by using from 2 to 4% by weight of iron oxide. It is to be noted also that the better results obtained when iron oxide was used were obtained at a considerably lower temperature than that employed when titania alone was used. It may be pointed out that in this particular example the iron oxide employed was a naturally occurring iron oxide known as Specular hematite and that it was simply physically admixed with the titania.

EXAMPLE II

Runs similar to those reported in Example I were conducted with titania alone and with titania mixed with nickel oxide. In this case also the nickel oxide was merely physically admixed with the titania which was employed in the form of a naturally occurring oxide known as rutile ore. The operating conditions and the results are shown in the following table:

*Methane oxidation with rutile ore plus $NiO_2$*

[Fluid bed; 200 v./v./hr.; atm. pressure]

| $NiO_2$ Present, percent | Zero | 1 | 3 |
|---|---|---|---|
| Temperature °F | 1,690 | 1,735 | 1,670 |
| Methane Conversion, percent | 9.6 | 37.8 | 83.0 |
| Selectivity To— | | | |
| CO | 96 | 85 | 72 |
| $CO_2$ | 2 | 0 | 7 |
| C | 2 | 15 | 21 |

These data again reflect the marked influence of the nickel oxide on the conversion attainable with titania. While the selectivity of CO with titania alone was 96% the conversion was only 9.6%. With 3% of nickel oxide, on the other hand, the conversion was increased to 83% while the selectivity to CO was reduced to 72%. Experience indicates that when nickel oxide is used as the addition agent it should not be present in amounts greater than 10%, although this upper limit may be increased when other addition agents are present.

EXAMPLE III

A set of runs similar to those reported above were made using titania alone and titania with different amounts of chromium oxide. The results obtained are shown in the following table:

*Methane oxidation with rutile ore plus $Cr_2O_3$*

[Fluid bed; 200 v./v./hr.; atm. pressure]

| $Cr_2O_3$ Present, percent | Zero | 1 | 3 |
|---|---|---|---|
| Temperature, °F | 1,690 | 1,710 | 1,745 |
| Methane Conversion, percent | 9.6 | 49.3 | 56.6 |
| Selectivity To— | | | |
| CO | 96 | 98 | 99 |
| $CO_2$ | 2 | 2 | 1 |
| C | 2 | 0 | 0 |

With this addition agent it will be observed that there was realized by the addition of chromium oxide a large increase in conversion without any decrease in selectivity. Actually with 3% by weight of chromium oxide the selectivity was almost 100%. It is noteworthy also that with this addition agent no carbon was formed. This addition agent may be employed in amounts up to 25% by weight.

EXAMPLE IV

Runs were made corresponding to those described in the previous examples using various amounts of an addition agent composed of 80% by weight of $Fe_2O_3$, 10% by weight of $Cr_2O_3$ and 10% by weight of NiO. The data obtained in these runs is compared in the following table with the data obtained when using titania alone:

*Methane oxidation with rutile ore plus*

$80Fe_2O_3$–$10Cr_2O_3$–$10NiO$

[Fluid bed; 200 v./v./hr.; atm. pressure]

| $80Fe_2O_3$–$10Cr_2O_3$–$10NiO$ Present, percent | Zero | 2 | 4 | 6 | 10 |
|---|---|---|---|---|---|
| Temperature, °F | 1,690 | 1,720 | 1,630 | 1,680 | 1,650 |
| Methane Conversion, percent | 9.6 | 56.7 | 64.0 | 78.5 | 93.4 |
| Selectivity To— | | | | | |
| CO | 96 | 94 | 93 | 99 | 31 |
| $CO_2$ | 2 | 6 | 5 | 1 | 54 |
| C | 2 | 0 | 2 | 0 | 15 |

This composite addition agent gave better results than any of the single addition agents. Particular attention is directed to the results obtained when using 6% by weight of the composite addition agent. Here the conversion was almost 80% while the selectivity to CO was almost 100% without any carbon formation. This particular addition agent seems to pass through a peak of effectiveness when used in amounts between about 3% and 7% by weight. It is to be noted that when 10% by weight was employed the selectivity dropped off and the carbon formation became appreciable.

EXAMPLE V

Runs similar to those described above were conducted when using varying amounts of a compound addition agent composed of 95% by weight of $Fe_2O_3$ and 5% by weight of $Cr_2O_3$. The results obtained in these runs are compared in the following table with the results obtained when using titania alone.

*Methane oxidation with rutile ore plus $95Fe_2O_3$–$5Cr_2O_3$*

[Fluid bed; 200 v./v./hr.; atm. pressure]

| $95Fe_2O_3$–$5Cr_2O_3$ Present, percent | Zero | 2 | 5 | 10 | 15 | 25 |
|---|---|---|---|---|---|---|
| Temperature, °F | 1,690 | 1,700 | 1,685 | 1,700 | 1,640 | 1,680 |
| Methane Conversion, percent | 9.6 | 56.7 | 35.5 | 77.3 | 82.2 | 74.5 |
| Selectivity To— | | | | | | |
| CO | 96 | 92 | 73 | 71 | 63 | 63 |
| $CO_2$ | 2 | 8 | 23 | 29 | 28 | 32 |
| C | 2 | 0 | 4 | 0 | 9 | 5 |

From the above data it may be seen that while the addition agent effects a very large increase in conversion with, in some cases, only a minor loss in selectivity as compared with the action of titania alone, the addition agent on the whole was not as effective as that reported in Example IV.

In all the foregoing examples the mixtures employed as oxygen carriers exhibited excellent fluidizing properties. These runs were all conducted in a quartz reactor.

Although in the foregoing description the specific operation described employed the fluidized solids technique, it is to be noted that in the practice of the present invention a fixed bed or a combination of a fixed bed and a fluidized solid bed may be employed. The pressure may be atmospheric or superatmospheric depending on design and economic considerations. Pressures as high as 600 p. s. i. are contemplated. The feed rate of the hydrocarbon gas may vary widely depending on other operating conditions. In general permissible feed rates will be higher the higher the operating temperature and pressure. Feed rates as low as 100 volumes of gas per volume of oxygen carrier per hour are contemplated and this feed rate may be as high as 3000 v./v./hr. The residence time of the oxygen carrier in the hydrocarbon oxidation zone will vary and is a function of the circulating rates control between the reactor and the regenerator required for temperature. This residence time is also a function of the oxygen to metal ratio in the oxygen carrier at which high selectivities with CO production are obtained. This residence time may vary from about 5 to 30 minutes. In general it is preferred to have a residence time of the oxygen carrier in the hydrocarbon oxidation zone in the range of about 10 to 15 minutes.

The nature and objects of the present invention having been described and illustrated, what is claimed as new and useful and is desired to be secured by Letters Patent is:

1. An oxygen carrier adapted for the oxidation of a normally gaseous hydrocarbon consisting essentially of a mixture containing about 97% titania, and the remainder an oxide of a metal commonly found in alloy steels and selected from the group consisting of iron, manganese, chromium, nickel, and tungsten.

2. An oxygen carrier adapted for the oxidation of a normally gaseous hydrocarbon consisting essentially of a mixture containing from about 94% to 97% of titania and the remainder oxides of iron, chromium, and nickel in the following relative percentages by weight $80Fe_2O_3$, 10 nickel oxide and 10 chromium oxide.

3. An oxygen carrier adapted for the oxidation of methane consisting essentially of titania in an amount of about 90% by weight, and the remainder iron oxide, nickel oxide and chromium oxide, the latter three components being in the following relative percentages by weight, 80Fe$_2$O$_3$, 10 nickel oxide and 10 chromium oxide.

EUGENE S. CORNER.
ROBERT V. J. McGEE.
CHARLES S. LYNCH.

REFERENCES CITED

The following references are of record in the file of this patent:

UNITED STATES PATENTS

| Number | Name | Date |
|---|---|---|
| Re. 21,932 | Frey et al. | Oct. 28, 1941 |
| 1,219,277 | Farup | Mar. 13, 1917 |
| 1,559,599 | Wintsch | Nov. 3, 1925 |
| 1,771,130 | Larson | July 22, 1930 |
| 1,832,666 | Specht | Nov. 17, 1931 |
| 2,349,438 | Koppers | May 23, 1944 |
| 2,396,398 | Turbett | Mar. 12, 1946 |
| 2,403,228 | McCord | July 2, 1946 |
| 2,405,566 | Feigley | Aug. 13, 1946 |

OTHER REFERENCES

Berkman et al.: Catalysis, Reinhold Pub. Corp., N. Y. (1940), p. 685.